United States Patent [19]
Coutin

[11] 3,756,545
[45] Sept. 4, 1973

[54] AIRCRAFT LOAD EJECTOR
[75] Inventor: Pierre Fernand Coutin, Paris, France
[73] Assignee: R. Alkan & Cie, Paris, France
[22] Filed: Oct. 6, 1971
[21] Appl. No.: 186,952

[30] Foreign Application Priority Data
Nov. 17, 1970 France .............................. 7041162

[52] U.S. Cl. .............................. 244/137 R, 89/1.5 F
[51] Int. Cl. .......................... B64d 1/02, B64d 37/12
[58] Field of Search ......................... 89/1.5 R, 1.5 F; 244/137 R

[56] References Cited
UNITED STATES PATENTS
2,931,341  4/1960  Meadows et al. .................... 244/137
3,037,805  6/1962  Geffner et al. ...................... 89/1.5 F
FOREIGN PATENTS OR APPLICATIONS
1,005,266  9/1965  Great Britain ...................... 244/137

*Primary Examiner*—Milton Buchler
*Assistant Examiner*—Galen L. Barefoot
*Attorney*—Linton & Linton

[57] ABSTRACT

In this retractable jettisoning device the ejection piston, whether single or telescopic, mounted in a cylinder of conventional type, is hollow and its inner cavity comprises a tubular distributor close at its outer end but provided adjacent this end with lateral ports adapted to co-act with an inner surface of the piston end for causing its inner space and the rear end of the piston to communicate with the atmosphere when this tubular distributor emerges from the ejection piston at the end of an expansion stroke of the ejection piston whereas the same movement of the tubular distributor uncovers lateral ports formed at the rear end of the piston to cause the fluid pressure in the chamber formed between the piston and the tubular distributor to act against the lower end of the fluid-tight portion of the piston in its cylinder, in order to move the piston upwards.

6 Claims, 10 Drawing Figures

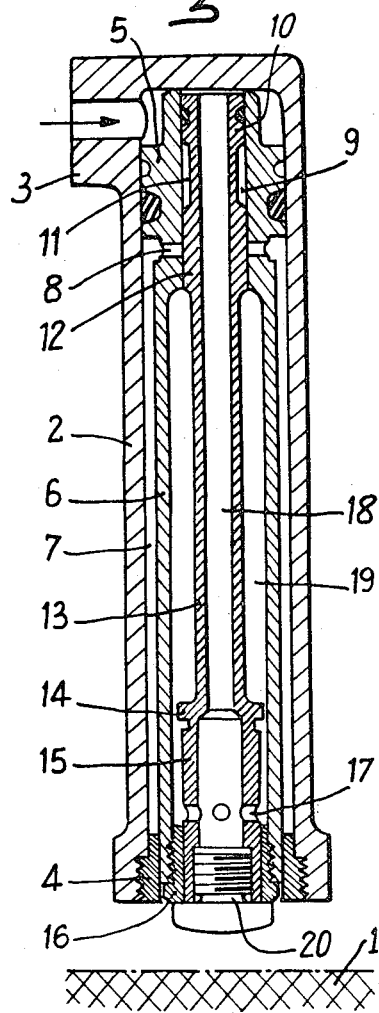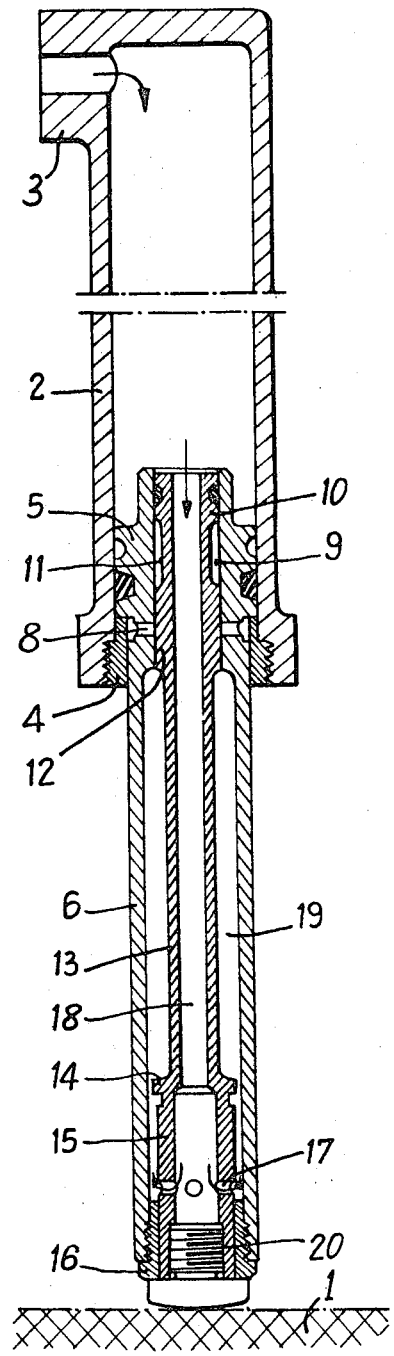

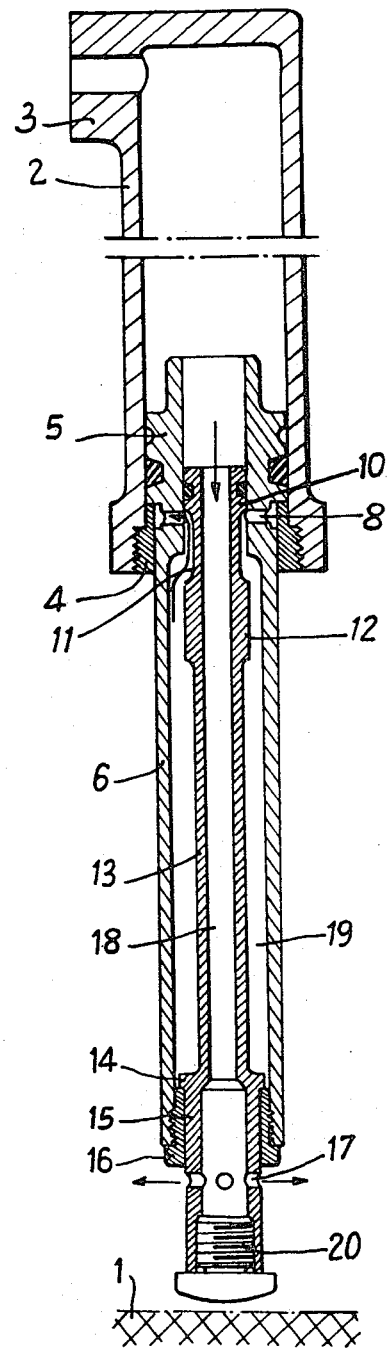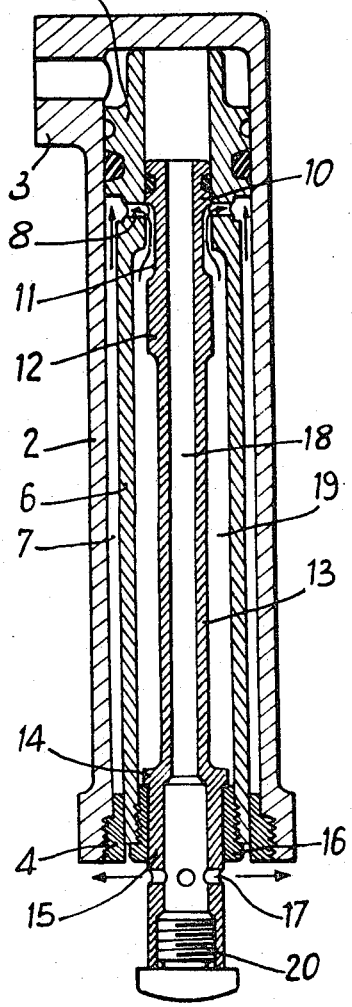

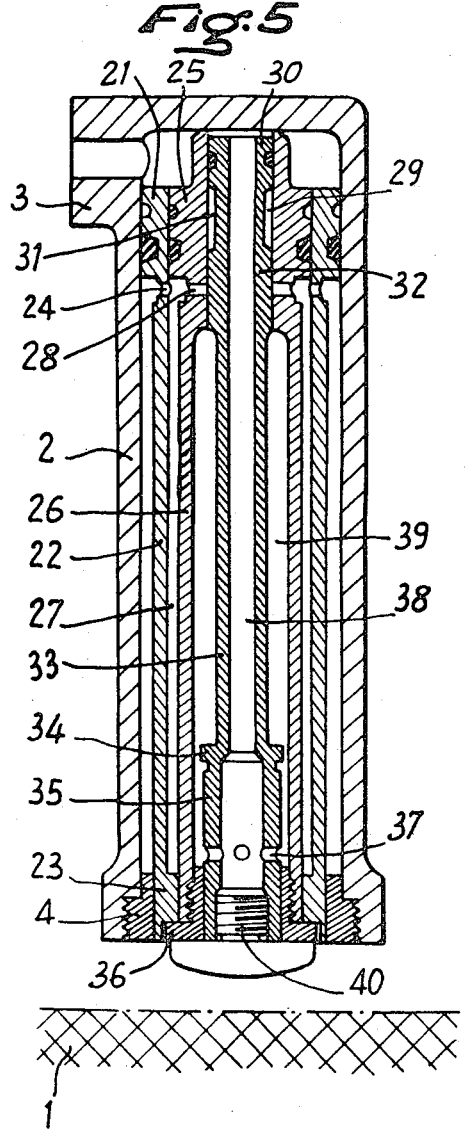
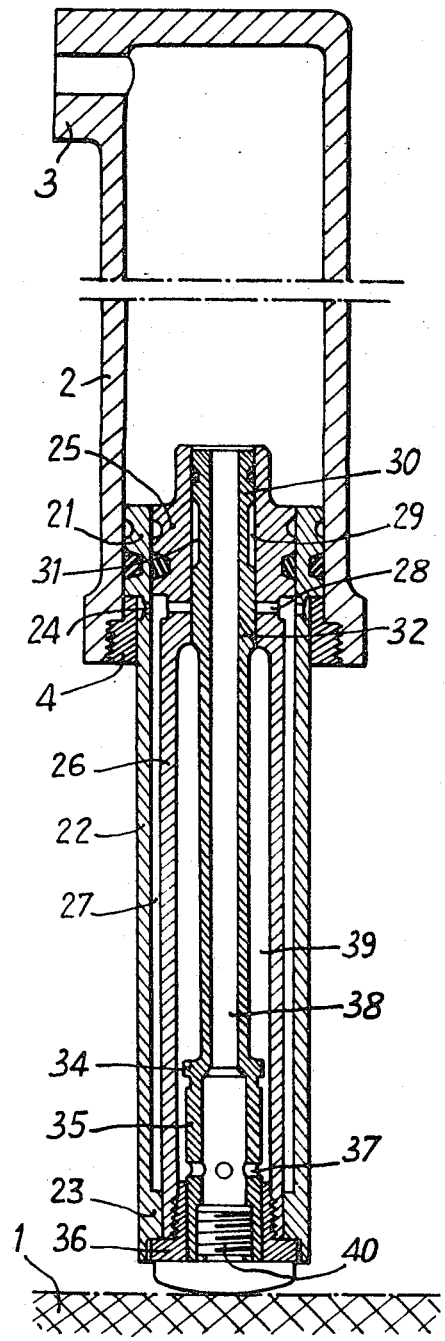
INVENTOR
PIERRE FERNAND COUTIN

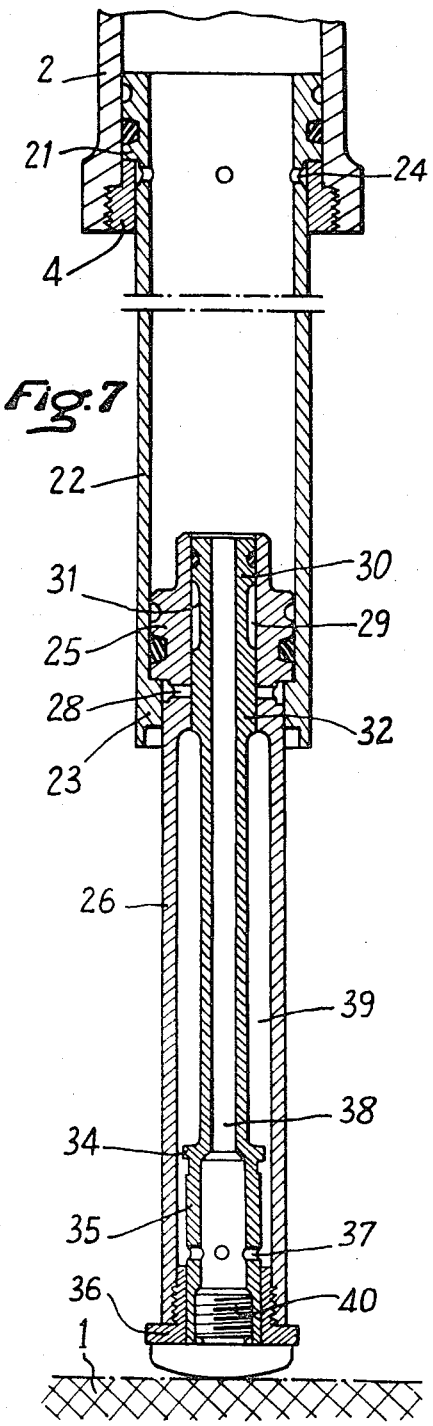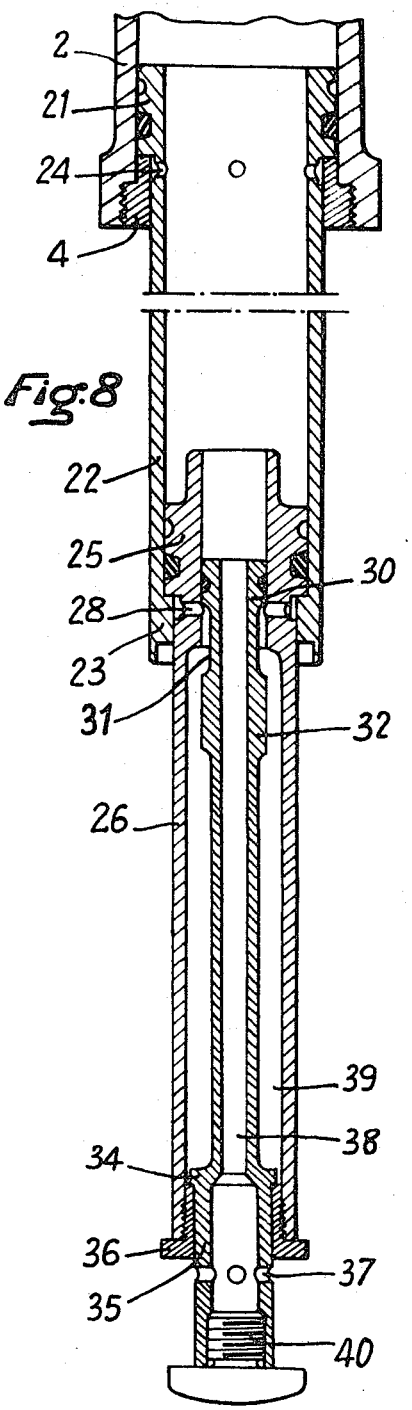

INVENTOR
PIERRE FERNAND COUTIN

By Linton and Linton
ATTORNEYS 3,756,545

AIRCRAFT LOAD EJECTOR

FIELD OF THE INVENTION

The present invention relates in general to means for jettisoning a load, notably a bomb, from an aircraft, and has specific reference to an ejector device of this character which is retractable to reduce drag.

DESCRIPTION OF THE PRIOR ART

As a rule, modern bomb jettisoning apparatus are of the so-called ejector type, i.e. provided with a piston adapted, during the release of a bomb, to impart thereto a strong thrust towards the ground, in order to prevent the bomb fron impinging against any part of the aircraft.

This piston, when it projects from the jettisoning device, is exposed to the relative wind and therefore constitutes a source of additional drag. To avoid this inconvenience, various attempts have been made with a view to make so-called retractable ejection pistons which, by exploiting the pressure having caused these pistons to emerge from the aircraft contour, resume automatically their initial position within the bomb jettisoning device. However, hitherto known retractable ejector devices are extremely complicated and therefore their maintenance (repairs and cleaning) constitutes a difficult task. Moreover, these devices are not designed for any convenient adaptation thereto to cylinders of existing non-retractable ejector cylinders, thus precluding the possibility of interchanging the ejection members.

SUMMARY OF THE INVENTION

It is the essential object of the present invention to provide an improved retractable ejector device which is free of the inconveniences set forth hereinabove and is simple to manufacture, easy to dissassemble and clean, and has an ejection piston easily interchangeable with the non-retractable piston of an existing bomb jettisoning device.

According to an essential feature characterizing this invention, the ejection piston, whether single or telescopic, mounted in a cylinder of conventional type, is hollow and its inner cavity comprises a tubular distributer close at its outer end but provided adjacent this end with lateral ports adapted to co-act with an inner surface of the piston end for causing its inner space and the rear end of the piston to communicate with the atmosphere when this tubular distributor emerges from the ejection piston at the end of an expansion stroke of the ejection piston whereas the same movement of the tubular distributor uncovers lateral ports formed at the rear end of the piston to cause the fluid pressure in the chamber formed between the piston and the tubular distributor to act against the lower end of the fluid-tight portion of the piston in its cylinder, in order to move the piston upwards.

BRIEF DESCRIPTION OF THE DRAWINGS

In order to afford a clearer understanding of this invention two typical forms of embodiment thereof will now be described by way of example, one form of embodiment comprising a single piston and the other a telescopic piston, with reference to the attached drawings, in which:

FIG. 1 is an axial section showing a single-piston ejection device in the position preceding its operation;

FIG. 2 is a similar view after the ejection piston has been expelled completely by the gas released during the combustion of a pyrotechnic charge during the release of a bomb;

FIG. 3 is a similar view showing the relative position of the elements after the tubular distributor has moved out from the piston;

FIG. 4 is a corresponding view showing the device after the return of the ejection piston to its retracted position;

FIG. 5 illustrates in axial section an ejection device comprising a two-section telescopic piston in the position obtaining before its operation;

FIG. 6 is a similar view after the expansion of the first telescopic element;

FIG. 7 is a similar view after the complete expansion of the telescopic ejection piston;

FIG. 8 is a corresponding view showing the device after the emergence of the internal tubular distributor;

DESCRIPTION OF THE PREFERRED EMBODIMENTS

Figure 9:
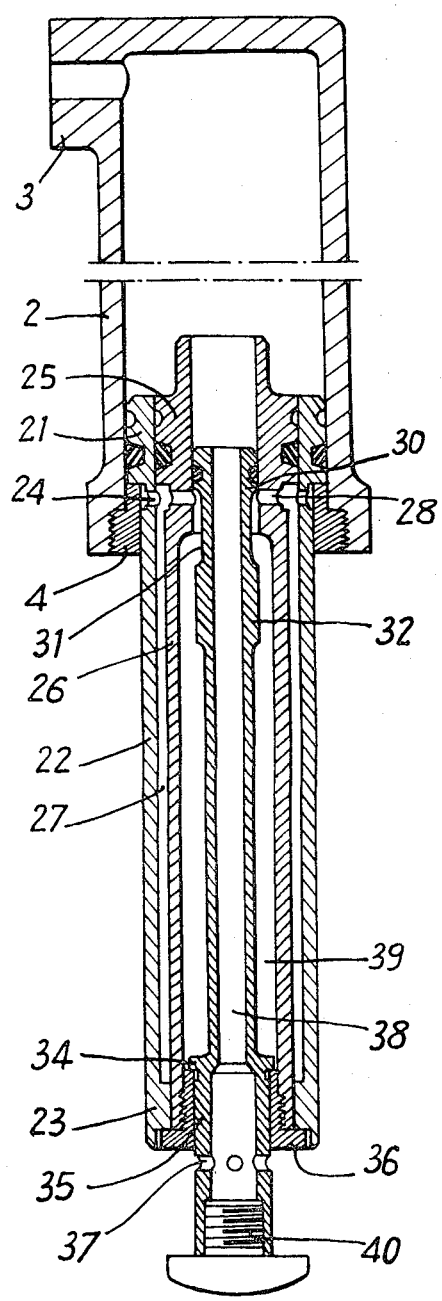
FIG. 9 is a corresponding view showing the device after the second telescopic element of the telescopic piston has resumed its internal position.

In all the Figures of the drawings, the reference numberal 1 designates very diagrammatically the bomb to be jettisoned which is attached to the aircraft through any conventional releasable means, and 2 is the vertical cylinder body rigid with the aircraft structure, in which the ejection piston is slidably mounted. At its upper end this cylinder 2 comprises a pipe 3 for supplying thereto the gas released as a consequence of the combustion of a pyrotechnic charge (not shown) during the release of the bomb. A ring 4 is screwed in the inner lower end of the aforesaid cylinder 2 for guiding the ejection piston while limiting its downward or outward stroke.

In the form of embodiment illustrated in FIGS. 1 to 4 the ejection piston comprises a rear section 5 adapted to slide in fluid-tight relationship in the bore of cylinder 2 until it abuts against the bottom ring 4 in the fully expanded position. The main body of the ejection piston as shown at 6 is adapted to slide through the ring 4 of which the inner diameter is somewhat smaller than that of said cylinder bore, whereby an annular chamber 7 of variable volume is formed between this cylinder 2 and the piston section 5. At the upper end of this chamber 7 the piston body 6 has formed through its wall a plurality of lateral ports 8 opening inwards into a cylindrical chamber 9 receiving the rear end of the hollow or tubular distributor open at the top. This tubular distributor comprises in succession, from top to bottom, a first section 10 slidably mounted in fluid-tight relationship in said chamber 9, a peripheral groove 11, a section 12 sliding in chamber 9 and closing the lateral ports 8 in the position obtaining before the actuation of the ejector (FIG. 1), a main body 13, a stroke-limiting flange or collar 14 and an end portion 15 adapted to slide in an end ring 16 screwed in the outer end of the piston body 6. This end portion 15 has formed through the lateral walls of the tubular distributor a plurality of ports 17 causing the inner chamber 18 of this distributor to communicate either with the inner annular chamber 19 of ejection piston 6 (as shown in FIGS. 1 and 2 ) or with the atmosphere (position of FIGS. 3 and 4), according as the tubular distributor is fully retracted in piston 6 or partially extracted therefrom. The reference numeral 20 designates a screw plug sealing the lower end of tubular distributor section 15 and it is obvious that by simply removing this plug 20 it is possible to clean the interior of the distributor and also to remove the ring 16 and the distributor proper (parts 10 to 15) for subsequently cleaning the interior of the ejection piston 5, 6. This plug 20 is advantageously provided with a wider external head projecting laterally beneath the ejection piston 6.

The operation of this device will be readily understood from the above description; therefore, it is only necessary to give a brief summary thereof. When a bomb is released, the pressure of the ejection gas is applied to the top of the piston section 5 so as to drive the piston downwards, this pressure being transmitted to the inner chamber 18 of the tubular distributor and also to the chamber 29 via ports 17. The piston assembly 5, 6 and the head of plug 20 move the bomb 1 away from the aircraft. This outward movement of piston 5, 6 is limited by the abutment of piston section 5 against the ring 4 (FIG. 2), but as the gas pressure continues to be exerted in chamber 18 the tubular distributor is moved outside the piston 5, 6 until its flange 14 engages the ring 16 (FIG. 3). In this position the ports 17 have cleared the ring 16 so as to isolate firstly the pressurized chamber 19 from the inner chamber 18 of said distributor, and then by causing this inner chamber 18 to communicate with the atmosphere, thus relieving the pressure above the piston 5, 6. At the same time, the external peripheral groove 11 of the tubular distributor is moved to a position in which it registers With the ports 8, thus causing the chamber 19 to communicate with the lower end of the ejection piston section 5. The pressure differential exerted on either side of this piston section 5 will then cause the piston assembly 5, 6 to rise to its limit-stroke position (FIG. 4), thus producing the desired complete retraction of the ejection piston.

In the modified form of embodiment illustrated in FIGS. 5 to 10 of the drawings the only difference with the preceding form of embodiment lies in the use of a telescopic ejection piston comprising essentially two tubular elements or sections. The outer element similar to the above-described piston assembly 5, 6 comprises a rear section 21 sliding in fluid-tight relationship in the cylinder 2, a main body 22 and a lower or outer section 23 having a reduced inner diameter. The wall of said body 22 has radial ports 24 formed therein just beneath the rear section 21, said ports 24 opening into the inner cylindrical cavity of assembly 21, 22 in which the inner telescopic element is adapted to slide. This assembly is again similar to the above-described piston assembly 5, 6 in that it comprises a rear section 25 adapted to slide in fluid-tight relationship in said assembly 21, 22 and a body 26 providing an annular cavity 27 between the two telescopic elements. Ports 28 are also formed through the wall of said body 26 and open inwards into a cylindrical cavity 29 receiving the upper end of the tubular distributor consisting of a hollow piston comprising in succession from top to bottom a fluid-tight portion 30, a peripheral groove 31, a section 32 slidably engaged in said cylindrical cavity 29 so as to close or uncover said ports 28, a main body 33, an abutment flange 34 and an end portion 35 slidably fitted in a ring 36 screwed to the lower end of the inner telescopic element. Ports 37, similar to ports 17, cause the inner chamber 38 of tubular distributor 30–35 to communicate either with the chamber 39 formed between the inner telescopic element and the tubular distributor, or with the atmosphere according as the tubular distributor is partially extracted from the inner telescopic element. A screw plug 40 seals the lower end of the tubular distributor and it is clear that the elements 25 to 40 described above respectively correspond to elements 5 to 20 of the form of embodiment of FIGS. 1 to 4. The lower part of ring 36 presents a flange which, in the retracted position of the inner telescopic element, abutes against a housing formed in the end portion 23 of the outer telescopic element.

The mode of operation of this modified device is similar to that of the preceding form of embodiment described in connection with FIGS. 1 to 4, except for the expansion of the telescopic piston which takes place in two successive strokes. During a first stroke, the complete piston assembly is pushed downwards with its tubular distributor until the rear portion 21 abuts against the ring 4 (FIG. 6).

Figure 10:
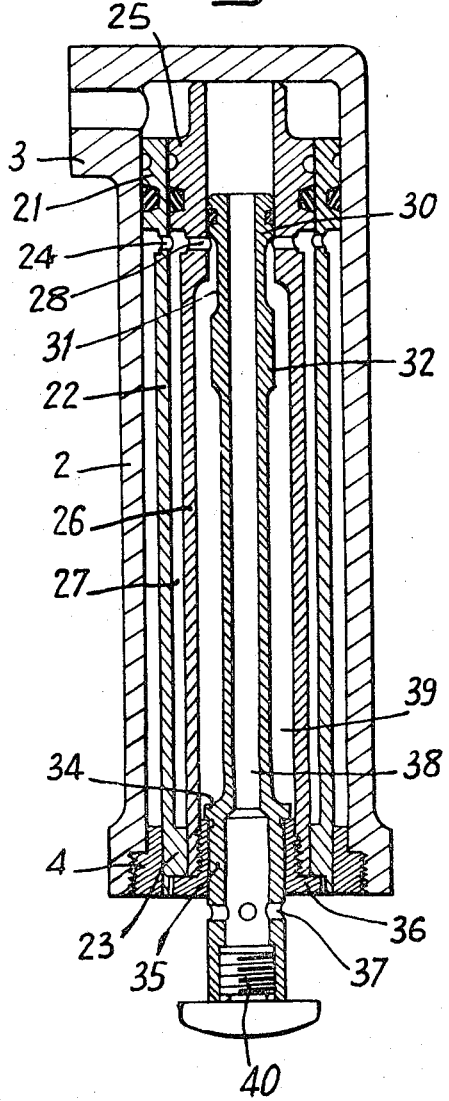
FIG. 10 is a corresponding view showing the device after the telescopic piston has been retracted completely.

Then the outer telescopic element is stopped but the inner element continues its outward or downward movement until its rear portion 25 abutes against the end of the inner reduced end portion 23 of the outer element (FIG. 7). The fluid pressure exerted in chamber 38 will then drive the tubular distributor downwards until its flange 34 engages the ring 36 (FIG. 8). The inner chamber 38 of said distributor will thus communicate with the atmosphere and chamber 39 communicates with the lower portion of the rear section 25 of the inner telescopic element, whereby the pressure in chamber 39 will cause this telescopic element to rise until the rear section 25 clears the ports 24 so that the fluid pressure can be exerted from beneath the rear section 21 of the outer telescopic element (FIG. 9). This telescopic element is thus retracted in turn by the residual pressure until the telescopic piston is retracted completely (FIG. 10).

The telescopic piston device affords a longer ejection stroke for a same axial dimension of the complete device and the latter can be cleaned and disassembled as easily as in the case of the first form of embodiment.

Although two different forms of embodiment of this invention have been shown and described herein, it will readily occur to those conversant with the art that various other modifications may be brought thereto without departing from the basic principles of the invention as set forth in the appended claims.

What I claim is:

1. A retractable ejector device for jettisoning a load from an aircraft comprising a cylinder having an inlet port at one end and a restricted open end, at least one piston positioned in and spaced from said cylinder, having a hollow interior open at both ends of said piston, a head at its inner end portion, slidable in said cylinder and of a greater diameter than said cylinder restricted open end, a restriction in said hollow interior and at least one port through said inner end portion, a tubular distributor positioned in and spaced from said piston hollow interior, having a head at its inner end slideable in said piston, an exterior recess in said tubular distributor head, a flange at its other end portion of greater diameter than said piston restriction and ports below said flange opening into said distributor interior and means closing said distributor at its outer end whereby gas from said cylinder port will move said piston outwardly and then said distributor for engaging and jettisoning the load and return said distributor and piston into said cylinder.

2. A device according to claim 1 wherein said piston comprises a single tubular element.

3. A device according to claim 1 wherein said piston comprises a plurality of telescopic tubular elements with each inner element thereof having an upper section sliding in fluidtight relationship with its surrounding elements, each of said surrounding elements having at least one port therethrough beneath its upper section and positioned for being cleared by the upper section of its inner element whereby the complete retraction of the inner element permits the gas to press against the upper section of its surrounding element driving said surrounding element inwardly.

4. A device according to claim 1 wherein a ring threadedly engages said cylinder open end providing the restriction therein and said piston is slideable in said ring.

5. A device according to claim 1 wherein a ring threadedly engages said piston interior providing the restriction therein and said distributor is slideable through said ring.

6. A device according to claim 1 wherein said closing means is a plug detachably mounted in said distributor outer end and extending outwardly and laterally of said piston other end.

* * * * *